United States Patent
Boguszewski et al.

(10) Patent No.: US 10,067,292 B2
(45) Date of Patent: Sep. 4, 2018

(54) SYSTEM, METHOD AND APPARATUS FOR ADJUSTING A FLAME SCANNER

(71) Applicant: GENERAL ELECTRIC TECHNOLOGY GMBH, Baden (CH)

(72) Inventors: Stanley Joseph Boguszewski, Russell, MA (US); Paul Chase, Suffield, CT (US); Robert Murphy, Wethersfield, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 15/176,841

(22) Filed: Jun. 8, 2016

(65) Prior Publication Data

US 2017/0357058 A1    Dec. 14, 2017

(51) Int. Cl.
| | |
|---|---|
| G02B 6/32 | (2006.01) |
| F23N 5/08 | (2006.01) |
| G02B 7/02 | (2006.01) |
| G02B 26/10 | (2006.01) |
| G01J 5/04 | (2006.01) |
| F23M 11/04 | (2006.01) |
| G02B 6/00 | (2006.01) |

(52) U.S. Cl.
CPC ............. *G02B 6/32* (2013.01); *F23M 11/045* (2013.01); *F23N 5/08* (2013.01); *F23N 5/082* (2013.01); *G01J 5/041* (2013.01); *G02B 7/023* (2013.01); *G02B 26/103* (2013.01); *F23N 2029/04* (2013.01); *F23N 2900/05005* (2013.01); *G02B 2006/0098* (2013.01)

(58) Field of Classification Search
CPC ........ G02B 6/32; G02B 7/023; G02B 26/103; G02B 2006/0098
See application file for complete search history.

(56) References Cited

U.S. PATENT DOCUMENTS

| | | |
|---|---|---|
| 4,328,488 A | 5/1982 | Yanai et al. |
| 4,737,038 A | 4/1988 | Dostoomian |
| 4,818,067 A | 4/1989 | Maisenbacher et al. |
| 4,983,853 A | 1/1991 | Davall et al. |
| 5,317,165 A * | 5/1994 | Montagna ............... F23N 5/082 250/227.23 |

(Continued)

FOREIGN PATENT DOCUMENTS

| | | |
|---|---|---|
| CA | 2711768 A1 | 8/2009 |
| DE | 2141711 B1 | 3/1973 |

(Continued)

OTHER PUBLICATIONS

EP Search Report and Opinion issued in connection with corresponding EP Application No. 17173329.8 dated Oct. 11, 2017.

*Primary Examiner* — Daniel Petkovsek
(74) *Attorney, Agent, or Firm* — GE Global Patent Operation; Stephen G. Midgley

(57) ABSTRACT

A flame scanner includes a lens barrel assembly defining a generally hollow body having a first end and a second end, and an opening formed in the first end, a lens positioned adjacent to the second end, and a fiber optic cable receivable through the opening in the first end, the fiber optic cable having a distal end. A field of view of the flame scanner is selectively adjustable by varying a position of the distal end of the fiber optic cable with respect to the lens.

16 Claims, 3 Drawing Sheets

(56) References Cited

U.S. PATENT DOCUMENTS

| | | | | |
|---|---|---|---|---|
| 5,521,697 A | * | 5/1996 | Stavinoha | ............... G01J 5/041 250/554 |
| 7,777,977 B2 | * | 8/2010 | Chase | .................. F23M 11/045 359/820 |
| 2005/0266363 A1 | * | 12/2005 | Ganeshan | ............... F23N 5/082 431/79 |
| 2009/0190186 A1 | | 7/2009 | Chase et al. | |

FOREIGN PATENT DOCUMENTS

| | | | | |
|---|---|---|---|---|
| EP | 0529324 A2 | | 3/1993 | |
| JP | 5583824 A | | 6/1980 | |
| JP | 5864425 A | | 4/1983 | |
| JP | 62143006 A | | 6/1987 | |
| JP | 2001174744 A | * | 6/2001 | ......... A61B 1/00059 |
| JP | 5661797 B2 | | 1/2015 | |

\* cited by examiner

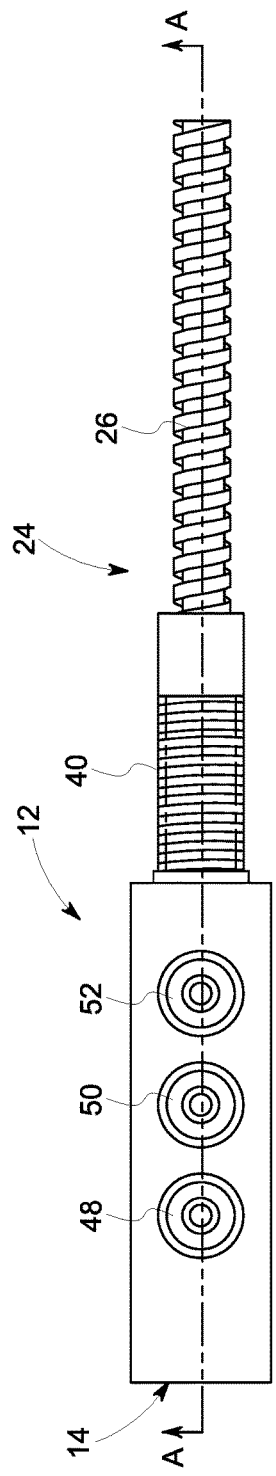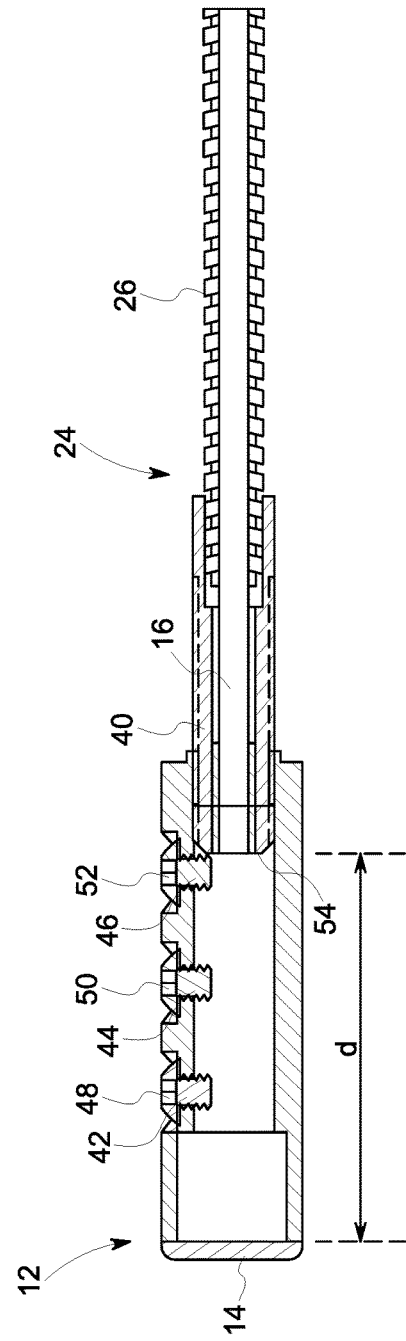

SYSTEM, METHOD AND APPARATUS FOR ADJUSTING A FLAME SCANNER

BACKGROUND

Technical Field

Embodiments of the invention relate generally to flame scanners for monitoring flames produced in a fossil fuel fire combustion chamber and, more particularly, to a system, method and apparatus for adjusting the field of view of a flame scanner.

Discussion of Art

A flame scanner monitors the combustion process in a fossil fuel fired combustion chamber to provide a signal indicating the presence or absence of a stable flame. With the presence of a stable flame, fossil fuel continues to be fed into the combustion chamber of the steam generator. In the event that the flame becomes unstable, or the flame is lost completely (known as a flame out condition), the flame scanner provides a loss of flame signal. Based upon a loss of flame signal, fossil fuel delivery to the combustion chamber can be discontinued before an undesirable unstable operating condition or flame out condition develops. In some systems, a human operator interrupts the fuel supply based upon the loss of flame signal; in other systems a burner management system (BMS) interrupts the fuel supply based upon the loss of flame signal.

Conventional flame scanners produce an electrical signal based upon a monitored flame. This resulting analog electrical signal is transmitted to processing electronics that are housed separately from the flame scanner, typically in an equipment rack located adjacent to a control room. The strength of the produced signal is typically proportional to the intensity of the monitored flame. If the signal strength falls below a lower set point, or rises above an upper set point, delivery of main fuel into the combustion chamber is interrupted. Set points are sometimes referred to as trip points.

One type of flame scanner is an ultraviolet tube flame scanner which produces a pulsed electrical output whose pulse rate is proportional to the intensity of ultraviolet light, in the range of approximately 250 to 400 nanometers, emitted by a flame. These scanners are particularly suited for monitoring gas flames since the emission from gas flames can be primarily in the ultraviolet range, with only minimal visible light emissions. Ultraviolet flame scanners based on Geiger-Müller tubes require extensive maintenance and have relatively limited operational lives as well as unstable failure modes.

Another type of flame scanner is a photodiode flame scanner. Photodiode flame scanners are the most prevalent type of flame scanner in use today in industrial application. In these flame scanners, visible light, in the range of approximately 400 to 700 nanometers, is collected from inside a combustion chamber, transmitted through a fiber optic cable, and directed onto a single photodiode to produce an electrical signal utilized by the separate processing electronics. Photodiode flame scanners are well suited for monitoring oil and coal flames, as emissions from such flames are in the visible and near infrared ranges.

Photodiode flame scanners mount on utility or industrial boilers and include two primary components. One component is a removable flame scanner assembly, i.e., a lens assembly, a flame sensor and fiber optic cable that extends between the lens assembly and the flame sensor). The flame sensor senses energy from the boiler via light transmission from the boiler flames by way of the fiber optic cable. The other component of the flame scanner includes a scanner guide pipe, which is a fixed, structural part of the boiler and disposed within the combustion chamber of the boiler. The flame scanner assembly fits into the guide pipe. Typically, existing flame scanners use one of several different lens barrel assemblies, each with fixed viewing angles. Often, however, the optimum viewing angle for a given application cannot be determined prior to installation of the flame scanner. Occasionally, an incorrect or non-optimal lens choice is made during an initial design phase of a given project, and is not discovered until commissioning, where it can cause rework and delays.

In view of the above there is a need for an adjustable flame scanner and related method that permits quick and easy adjustment of the viewing angle of a lens assembly of the flame scanner.

BRIEF DESCRIPTION

In an embodiment, a flame scanner is provided. The flame scanner includes a lens barrel assembly defining a generally hollow body having a first end and a second end, and an opening formed in the first end, a lens positioned adjacent to the second end, and a fiber optic cable receivable through the opening in the first end, the fiber optic cable having a distal end. A field of view of the flame scanner is selectively adjustable by varying a position of the distal end of the fiber optic cable with respect to the lens.

In another embodiment, a method for varying a field of view of a flame scanner is provided. The method includes the steps of inserting a distal end of a fiber optic cable into an opening in an end of a lens barrel assembly, the lens barrel assembly having a lens positioned adjacent to a distal end of the lens barrel assembly opposite the opening, and advancing the fiber optic cable into the lens barrel assembly towards the lens until the distal end of the fiber optic cable is positioned at a desired distance from the lens corresponding to a desired field of view of the flame scanner.

In yet another embodiment, a flame scanner for monitoring a flame in a combustion chamber is provided. The flame scanner includes a lens barrel assembly defining a generally hollow body having a first end and a second end, an opening formed in the first end, and a lens positioned adjacent to the second end, and a fiber optic cable receivable through the opening in the first end, the fiber optic cable having a distal end. A field of view of the flame scanner is selectively adjustable by varying a position of the distal end of the fiber optic cable with respect to the lens.

DRAWINGS

The present invention will be better understood from reading the following description of non-limiting embodiments, with reference to the attached drawings, wherein below:

FIG. 2 is a top plan view of a lens barrel assembly of the flame scanner of FIG. 1.

FIG. 3 is a cross-sectional view of the lens barrel assembly, taken along line A-A of FIG. 2.

DETAILED DESCRIPTION

Figure 1:
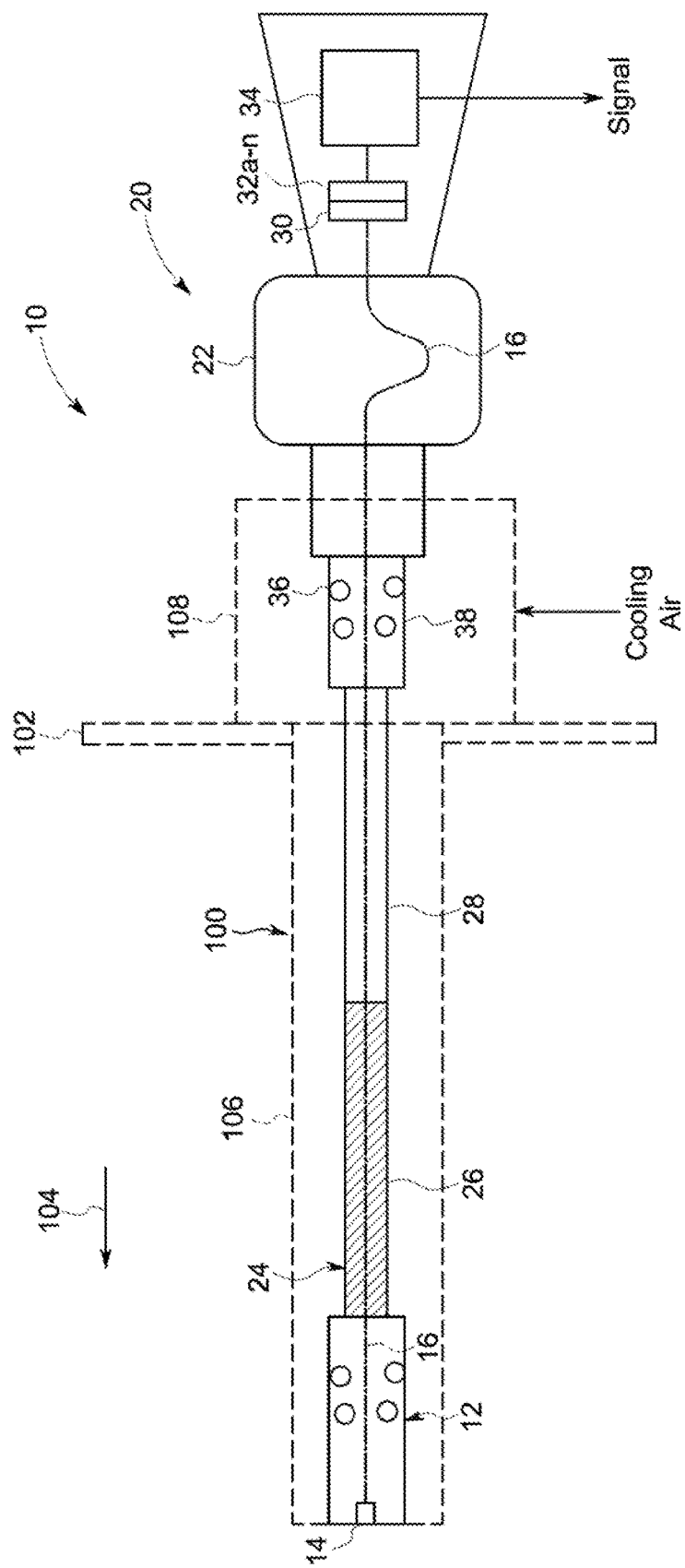
FIG. 1 is a simplified schematic depiction of a flame scanner in accordance with an embodiment of the present invention.

Reference will be made below in detail to exemplary embodiments of the invention, examples of which are illustrated in the accompanying drawings. Wherever possible, the same reference characters used throughout the drawings refer to the same or like parts. While embodiments of the invention are suitable for use in connection with a flame scanner for monitoring the combustion process in a fossil fuel fired combustion chamber to provide a signal indicating the presence or absence of a stable flame, embodiments of the invention may also be utilized in connection with flame scanners and sensing devices for a variety of monitoring applications, more generally. In particular, the general configuration of the flame scanner disclosed herein may be equally applicable to any fiber optic or other video or image monitoring device where it is desirable to provide for field of view adjustment. In an embodiment, the flame scanner may be utilized in either tangential fired (T-fired) or wall-fired boilers, as well as used with any, or all of, coal-, oil-, gas-, and/or other fuel-fired burners.

As used herein, the terms "substantially," "generally," and "about" indicate conditions within reasonably achievable manufacturing and assembly tolerances, relative to ideal desired conditions suitable for achieving the functional purpose of a component or assembly. As used herein, "operatively coupled" refers to a connection, which may be direct or indirect. The connection is not necessarily a mechanical attachment. As used herein, "mechanically coupled" refers to any coupling method capable of supporting the necessary forces for transmitting torque between components.

Embodiments of the invention relate to a system and method for adjusting a flame scanner and, more particularly, to a system and method for adjusting the viewing angle of a lens of a flame scanner. With reference to FIG. 1, a flame scanner 10 includes a lens barrel assembly 12 having a lens 14 positioned at a distal end thereof, and a fiber optic cable 16 received by the lens barrel assembly 12. As shown therein, the fiber optic cable 16 extends from the lens barrel assembly 12 to a detector head assembly 20. In an embodiment, the flame scanner 10 may include a spool assembly 22 between the lens barrel assembly 12 and the detector head assembly 20 that allows the length of the flame scanner to be selectively adjusted.

As illustrated in FIG. 1, a guide pipe assembly 100 secures the flame scanner 10 to a wall 102 of a combustion chamber 104. The guide pipe assembly 100 includes a guide pipe 106, which extends into the combustion chamber 104, and a manifold coupling 108 which is disposed outside the combustion chamber 104 and is attached to wall 102. The detector head assembly 20 and spool assembly 22 are mounted to the outside of wall 102, while the lens barrel assembly 12 of the flame scanner 10 is positioned inside the guide pipe 106 within the combustion chamber 104. The fiber optic cable 16 extends within the guide pipe 106 and manifold coupling 108 to connect the spool assembly 22 and detector head assembly 20 to the lens barrel assembly 12 through the wall 102. In an embodiment, all metal components of the lens barrel assembly 12 and the fiber optic cable 16 that are subjected to high heat are constructed of type 304 stainless steel.

With further reference to FIG. 1., in an embodiment, the lens 14 of the lens barrel assembly 12 is a replaceable quartz lens. The fiber optic cable 16 extends from the lens barrel assembly 12 through a protective sleeve 24 that connects the lens barrel assembly 12 to the spool assembly 22 and the detector head assembly 20. The protective sleeve 24 is made of a material suitable to protect the fiber optic cable 16 from the environmental conditions within the combustion chamber 104. For example, in an embedment, the protective sleeve 24 may be made of a steel flex hose 26 and a steel pipe 28 connected to the flex hose 26. In other embodiments, the protective sleeve 24 may be made of other materials that are capable of protecting the fiber optic cable 16 from environmental conditions within the combustion chamber 104. As is known, the fiber optic cable 16 is configured to transmit light collected by the quartz lens 14 to a splitter 30 located inside the detector head assembly 20. Quartz or other cables may be utilized, as desired.

The splitter 30 directs the collected light onto each of multiple photodiodes 32a-32n. Each photodiode 32a-32n converts light energy into an electrical signal. In an embodiment, each electrical signal is then sent to an onboard digital signal processor 34, although separate and remote processing electronics may be utilized without departing from the broader aspects of the invention. In any case, the flame scanner 10 may output a signal indicative of a condition of the flame in the combustion chamber 104.

With further reference to FIG. 1, the manifold coupling 108 receives air from an external source, and internal channels within the manifold coupling 108 direct the air to apertures 36 disposed within a mounting shaft 38, which is attached to the end of the sleeve 24. This air passes through the apertures 36 and through the sleeve 24 to the lens barrel assembly 12 to cool the fiber optic cable 16 and clean the lens 14 from debris. Air from the manifold coupling 108 may also pass between the guide pipe 106 and fiber optic cable for cooling and cleaning purposes.

The spool assembly 22 has a chamber disposed therein for receiving one or more coils, or other excess amount, of fiber optic cable 16. The mounting shaft 38 is slidably received within one end of the spool assembly 22 and may be pushed axially into, or pulled axially outward from, the spool assembly 22, thereby adjusting the length of the flame scanner 10, as more fully discussed in U.S. Pat. No. 7,646, 005, which is hereby incorporated by reference herein. The spool assembly 22 receives excess fiber optic cable 16 when the flame scanner 10 is shortened, and the excess fiber optic cable 16 in the spool assembly 22 provides sufficient cable 16 for lengthening of the flame scanner 10. Once the desired length is achieved, the mounting shaft 38 may be locked in place relative to the spool assembly 22 to fix the flame scanner 10 length. This "telescopic" adjustment in flame scanner 10 length allows for variations in flame scanner length due to loose manufacturing tolerances or poor documentation, while still achieving a proper fit up in the field. In an embodiment, the spool assembly 22 may be omitted from the flame scanner 10.

Turning now to FIGS. 2 and 3, an enlarged view of the lens barrel assembly 12 of the flame scanner 10 is more clearly illustrated. As illustrated therein, the lens barrel assembly 12 is a generally hollow cylindrical body having an opening at one end thereof and lens 14 disposed at the opposed distal end thereof. The fiber optic cable 16 is encased in protective sleeve 24 which may include flexible hose 26 and a first mating portion, such as, for example, an externally threaded coupling portion 40. As best illustrated in FIG. 3, the coupling portion 40 is received by a corresponding second mating portion, such as, for example, internally threaded portion of the lens barrel assembly 12.

As further illustrated in FIGS. 2 and 3 the lens barrel assembly 12 includes a plurality of threaded apertures 42, 44, 46 formed in the cylindrical body at various longitudinal positions along the body. Each of the apertures 42, 44, 46 receives a corresponding position screw or fasteners 48, 50, 52, respectively, therein. In an embodiment, there are three apertures and corresponding screws, although more or fewer than three apertures and screws may be utilized without departing from the broader aspects of the invention. The apertures 42, 44, 46 and screws 48, 50, 52 define a plurality of position stops for setting a distance, d, between a distal end 54 of the fiber optic cable 16 and the lens 14, as discussed in detail hereinafter.

In an embodiment, the distance, d, of the distal end 54 of the fiber optical cable 16 from the lens 14 may be selectively adjusted by rotating the lens barrel assembly 12 with respect to the protective sleeve 24. In particular, rotation in one direction advances the distal end 54 of the cable 16 with respect to the lens 14, while rotating in an opposite direction retracts the distal end 54 of the cable 16 with respect to the lens. As will be readily appreciated, by moving the distal end 54 of the fiber optic cable 16 closer to the lens 14, the field of view may be increased. Conversely, by moving the distal end 54 of the cable 16 away from the lens, the field of view may be decreased.

With specific reference to FIG. 3, in operation, a technician or user may first determine a desired position of the distal end 54 of the cable 16 with respect to the lens 14 in order to provide for an anticipated optimum viewing angle. For example, if it is initially determined that the distal end 54 of the cable 16 should be positioned distal from the lens 14, then a user may adjust position screw 52 so that it protrudes into the interior cavity of the lens barrel assembly 12. A user may then advance the cable 16 into the lens barrel assembly 14 by rotating one of the lens barrel assembly 12 and the protective sleeve 24 with respect to the other until the end of the coupling portion 40 contacts the position screw 52, which thereby sets the position of the distal end 54 of the cable 16. In this position, the position screw 52 prevents the cable 16 from advancing closer to the lens 14.

If, however, it is subsequently realized that the initial determination of the optimum viewing angle/cable position is incorrect or non-optimal, the viewing angle may be easily adjusted by changing the position of the cable 16 with respect to the lens 14 (i.e., the insertion depth of the cable 16 within the lens barrel assembly 12). For example, if it is determined that the viewing angle must be increased, the position screw 52 may be retracted so that it does not impeded the advancement of the cable 16 within the lens barrel assembly 12. One of the position screws 48, 50 (corresponding to a desired cable position) may then be adjusted so that it protrudes into the interior cavity of the assembly 12. The cable 16 may then be advanced within the lens barrel assembly 12 until the coupling portion 40 of the sleeve 24 contacts the position screw 48 or 50 corresponding to the desired cable position in order to increase the viewing angle. This telescopic adjustment of the cable position with respect to the lens 14 allows for the viewing angle to be quickly and easily adjusted.

Figure 4:
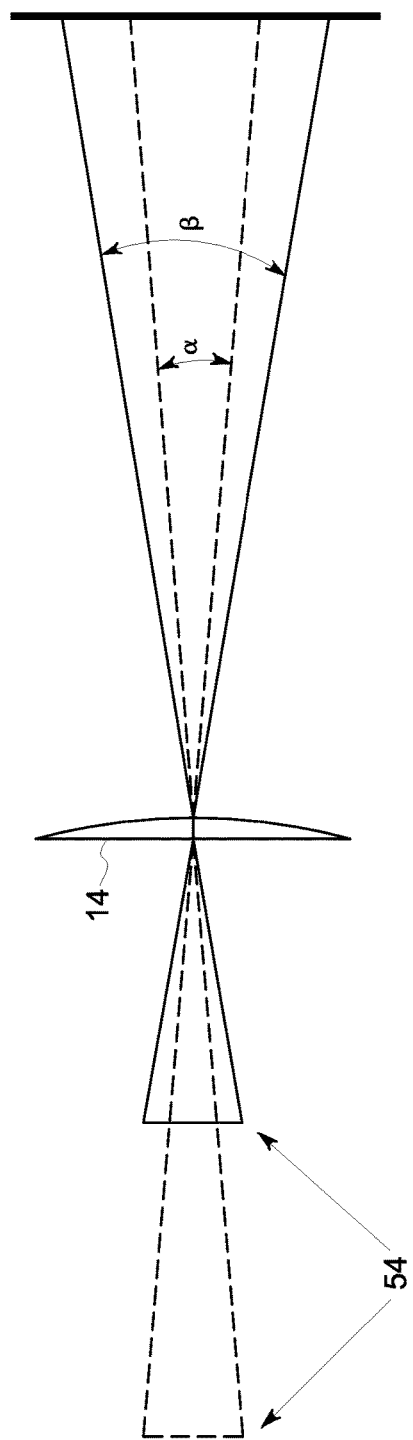
FIG. 4 is a simplified schematic illustration showing the effect of fiber optic cable positioning on the viewing angle of a lens of the lens barrel assembly.

Referring now to FIG. 4 the effect of fiber optic cable position on the viewing angle is illustrated in simplified schematic form. As shown therein, positioning the distal end 54 of the cable 16 further away from the lens 14 yields a smaller viewing angle, a, (and thus smaller field of view) while positioning the distal end 54 of the cable 16 closer to the lens yields a larger viewing angle, β (and thus larger field of view). As such, moving the distal end 54 of the fiber optic cable 16 to correspond with the position stop defined by screw 48 or 50 yields an increased viewing angle (and field of view) compared to a situation where the distal end 54 of the cable 16 corresponds with the position stop defined by screw 52.

While the embodiments described above utilize a threaded connection between the fiber optic cable and the lens barrel assembly, and threaded position stops, other mechanisms for slidably or telescopically adjusting the position of the distal end of the cable with respect to the lens may also be utilized without departing from the broader aspects of the present invention. For example, the coupling portion 40 and lens barrel assembly 12 may include a ball-detent mechanism or spring-biased pin and aperture mechanism facilitate the selective adjustment and positioning of the distal end 54 of the fiber optic cable 16 with respect to the lens 14.

The flame scanner 10 of the invention therefore allows for quick and easy in-field adjustment of the viewing angle of the flame scanner, allowing the flame scanner 10 to be essentially 'tuned' during installation and testing. In particular, the telescopic adjustment mechanism of the flame scanner 10 allows a technician to adjust the field of view of the flam scanner to adapt to unforeseen field conditions encountered during commissioning, and/or to optimize the flame scanner for best performance. This invention therefore obviates the need to choose one of multiple lens each having a fixed viewing angle during the proposal or design phase of a project, and from having to reorder components if a non-optimal lens is chosen. Because the flame scanner 10 is relatively simple in design, it may be adopted without substantial increase in material or project costs. In addition, the invention may obviate the need to manufacture many different flame scanners with different fixed viewing angles, thereby decreasing overall manufacturing and inventory costs.

In an embodiment, a flame scanner is provided. The flame scanner includes a lens barrel assembly defining a generally hollow body having a first end and a second end, and an opening formed in the first end, a lens positioned adjacent to the second end, and a fiber optic cable receivable through the opening in the first end, the fiber optic cable having a distal end. A position of the distal end of the fiber optic cable is adjustable with respect to the lens in order to selectively adjust a field of view of the flame scanner. In an embodiment, the lens barrel assembly includes a plurality of position stops, each position stop corresponding to a different position to set the position of the distal end of the fiber optic cable with respect to the lens. In an embodiment, the flame scanner further includes a coupling portion connected to the fiber optic cable and receiving the distal end of the fiber optic cable therein. The coupling portion is receivable in the opening of the lens barrel assembly. In an embodiment, the coupling portion includes a first mating portion that is received by a corresponding second mating portion of the lens barrel assembly. In an embodiment, the position stops each include an adjustable fastener. In an embodiment, the fasteners are each adjustable between a first position in which they protrude into the hollow body of the lens barrel assembly and contact the coupling portion to limit the longitudinal advancement of the distal end of the fiber optic cable in the lens barrel assembly towards the lens, and a second position in which they do not protrude into the hollow body such that the coupling portion and distal end of the fiber optic cable can advanced longitudinally in the lens barrel assembly towards the lens. In an embodiment, the position stops are three position stops. In an embodiment, the lens is removable from the lens barrel assembly. In an embodiment, the lens barrel assembly is selectively mountable within a guide pipe that extends into a combustion chamber.

In another embodiment, a method for varying a field of view of a flame scanner is provided. The method includes the steps of inserting a distal end of a fiber optic cable into an opening in an end of a lens barrel assembly, the lens barrel assembly having a lens positioned adjacent to a distal end of the lens barrel assembly opposite the opening, and advancing the fiber optic cable into the lens barrel assembly towards the lens until the distal end of the fiber optic cable is positioned at a desired distance from the lens corresponding to a desired field of view of the flame scanner. In an embodiment, the step of advancing the fiber optic cable towards the lens includes rotating one of a coupling portion and the lens barrel assembly with respect to the other of the coupling portion and the lens barrel assembly, wherein the coupling portion is connected to, and houses, the fiber optic cable. In an embodiment, the method may also include the step of extending a first position stop into an interior cavity of the lens barrel assembly. Advancing the fiber optic cable into the lens barrel assembly towards the lens includes advancing the fiber optic cable into the lens barrel assembly until the coupling portion contacts the position stop. In an embodiment, the method may further include the step of increasing the field of view of the flame scanner by retracting the first position stop from the interior cavity, extending a second position stop into the interior cavity, and advancing the fiber optic cable into the lens barrel assembly towards the lens until the coupling portion contacts the second position stop. In this embodiment, the second position stop is located closer to the lens than the first position stop. In an embodiment, the first and second position stops are first and second screws received in first and second apertures in a body of the lens barrel assembly. In an embodiment, the method may also include the steps of inserting the lens barrel assembly into a guide pipe that extends into a combustion chamber and securing the flame scanner to a wall of the combustion chamber. In an embodiment, the coupling portion includes a first mating portion and the lens barrel assembly includes a second mating portion that receives the first mating portion of the coupling portion.

In yet another embodiment, a flame scanner for monitoring a flame in a combustion chamber is provided. The flame scanner includes a lens barrel assembly defining a generally hollow body having a first end and a second end, an opening formed in the first end, and a lens positioned adjacent to the second end, and a fiber optic cable receivable through the opening in the first end, the fiber optic cable having a distal end. A field of view of the flame scanner is selectively adjustable by varying a position of the distal end of the fiber optic cable with respect to the lens. In an embodiment, the lens barrel assembly includes a plurality of position stops that limit the insertion depth of the fiber optic cable, wherein each of the position stops corresponds to a different field of view. In an embodiment, the flame scanner includes a coupling portion connected to the fiber optic cable and receiving the distal end of the fiber optic cable therein, wherein the coupling portion is threadedly receivable in the opening of the lens barrel assembly. In an embodiment, the coupling portion includes a first mating portion that is received by a corresponding second mating portion of the lens barrel assembly.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system, method and apparatus without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A flame scanner, comprising:
   a lens barrel assembly defining a hollow body having a first end and a second end, and an opening formed in the first end, the hollow body including a plurality of apertures therein, each aperture disposed at a respective longitudinal position along the body;
   a lens positioned adjacent to the second end; and
   a fiber optic cable receivable through the opening in the first end, the fiber optic cable having a distal end;
   wherein the lens barrel assembly includes a plurality of fasteners, each fastener received in a respective aperture of the plurality of apertures, the plurality of fasteners defining a respective plurality of position stops, each position stop corresponding to a different position to set the position of the distal end of the fiber optic cable with respect to the lens; and wherein a field of view of the flame scanner is selectively adjustable by varying the position of the distal end of the fiber optic cable with respect to the lens.

2. The flame scanner of claim 1, wherein:
the distal end of the fiber optic cable is received within a coupling portion;
wherein the coupling portion is receivable in the opening of the lens barrel assembly.

3. The flame scanner of claim 2, wherein:
the coupling portion includes a first mating portion that is received by a corresponding second mating portion of the lens barrel assembly.

4. The flame scanner of claim 3, wherein:
the position stops each include an adjustable fastener.

5. The flame scanner of claim 4, wherein:
the fasteners are each adjustable between a first position in which they limit advancement of the distal end of the fiber optic cable in the lens barrel assembly towards the lens, and a second position in which they do not limit advancement of the distal end of the fiber optic cable within the lens barrel assembly.

6. The flame scanner of claim 4, wherein:
the position stops are three position stops.

7. The flame scanner of claim 1, wherein:
the lens is removable from the lens barrel assembly.

8. The flame scanner of claim 1, wherein:
the lens barrel assembly is selectively mountable within a guide pipe that extends into a combustion chamber.

9. A method for varying a field of view of a flame scanner, comprising the steps of:
inserting a distal end of a fiber optic cable into an opening in an end of a lens barrel assembly, the lens barrel assembly having a lens positioned adjacent to a distal end of the lens barrel assembly opposite the opening; and
advancing the fiber optic cable into the lens barrel assembly towards the lens by rotating one of a coupling portion and the lens barrel assembly with respect to the other of the coupling portion and the lens barrel assembly, until the distal end of the fiber optic cable is positioned at a desired distance from the lens corresponding to a desired field of view of the flame scanner;
extending a first position stop into an interior cavity of the lens barrel assembly;
wherein advancing the fiber optic cable into the lens barrel assembly towards the lens includes advancing the fiber optic cable into the lens barrel assembly until the coupling portion contacts the position stop;
wherein the coupling portion is connected to, and houses, the fiber optic cable.

10. The method according to claim 9, further comprising the step of:
increasing the field of view of the flame scanner by retracting the first position stop from the interior cavity, extending a second position stop into the interior cavity, and advancing the fiber optic cable into the lens barrel assembly towards the lens until the coupling portion contacts the second position stop;
wherein the second position stop is located closer to the lens than the first position stop.

11. The method according to claim 10, wherein:
the first and second position stops are first and second screws received in first and second apertures in a body of the lens barrel assembly.

12. The method according to claim 9, further comprising the step of:
inserting the lens barrel assembly into a guide pipe that extends into a combustion chamber; and
securing the flame scanner to a wall of the combustion chamber.

13. The method according to claim 9, wherein: the coupling portion includes a first mating portion;
and the lens barrel assembly includes a second mating portion that receives the first mating portion of the coupling portion.

14. A flame scanner for monitoring a flame in a combustion chamber, comprising:
a lens barrel assembly defining a hollow body having a first end and a second end, an opening formed in the first end, and a lens positioned adjacent to the second end, the hollow body including a plurality of apertures therein, each aperture disposed at a respective longitudinal position along the body; and
a fiber optic cable receivable through the opening in the first end, the fiber optic cable having a distal end;
wherein a field of view of the flame scanner is selectively adjustable by varying a position of the distal end of the fiber optic cable with respect to the lens
wherein the lens barrel assembly includes a plurality of fasteners, each fastener received in a respective aperture of the plurality of apertures, the plurality of fasteners defining a respective plurality of position stops for limiting the insertion depth of the fiber optic cable;
wherein each of the position stops corresponds to a different field of view of the flame scanner.

15. The flame scanner of claim 14, further comprising:
a coupling portion connected to the fiber optic cable and receiving the distal end of the fiber optic cable therein;
wherein the coupling portion is receivable in the opening of the lens barrel assembly.

16. The flame scanner of claim 15, wherein:
the coupling portion includes a first mating portion that is received by a corresponding second mating portion of the lens barrel assembly.

* * * * *